(12) United States Patent
Bonny

(10) Patent No.: US 11,416,448 B1
(45) Date of Patent: Aug. 16, 2022

(54) ASYNCHRONOUS SEARCHING OF PROTECTED AREAS OF A PROVIDER NETWORK

(71) Applicant: Amazon Technologies, Inc., Seattle, WA (US)

(72) Inventor: Jean-Paul Stephane Bonny, Falls Church, WA (US)

(73) Assignee: Amazon Technologies, Inc., Seattle, WA (US)

( * ) Notice: Subject to any disclaimer, the term of this patent is extended or adjusted under 35 U.S.C. 154(b) by 438 days.

(21) Appl. No.: 16/540,875

(22) Filed: Aug. 14, 2019

(51) Int. Cl.
| | |
|---|---|
| *G06F 16/00* | (2019.01) |
| *G06F 16/14* | (2019.01) |
| *G06F 16/248* | (2019.01) |
| *G06F 21/62* | (2013.01) |

(52) U.S. Cl.
CPC .......... *G06F 16/148* (2019.01); *G06F 16/248* (2019.01); *G06F 21/6227* (2013.01)

(58) Field of Classification Search
CPC .... G06F 21/6227; G06F 16/148; G06F 16/24; G06F 16/08
USPC ................................................ 707/600–899
See application file for complete search history.

(56) References Cited

U.S. PATENT DOCUMENTS

| | | | |
|---|---|---|---|
| 8,346,774 B1* | 1/2013 | Kanevsky | G06F 16/24561 707/711 |
| 2004/0228352 A1* | 11/2004 | Constantinof | H04L 67/14 370/395.21 |
| 2013/0117313 A1* | 5/2013 | Miao | G06F 21/604 707/781 |
| 2020/0050684 A1* | 2/2020 | Vajravel | G06F 16/1734 |
| 2020/0334304 A1* | 10/2020 | Reddy Vennapusa | G06F 16/958 |
| 2021/0042262 A1* | 2/2021 | Nair | G06F 21/602 |

* cited by examiner

*Primary Examiner* — Michelle N Owyang
(74) *Attorney, Agent, or Firm* — Nicholson De Vos Webster & Elliott LLP

(57) ABSTRACT

Techniques for asynchronous searching of protected areas of a provider network are described. A method of asynchronous searching of protected areas of a provider network comprises receiving a search request at a secure query service of a provider network, the search request specifying a search condition for one or more resources in a protected area of the provider network, filtering the search request using a first filter to produce a filtered search request, providing the filtered search request to the protected area of the provider network, obtaining a search result based on execution of the search request in the protected area, filtering the search result using a second filter to produce a filtered search result, and generating a search response based on the filtered search result.

20 Claims, 10 Drawing Sheets

```
<XS:SIMPLETYPE NAME="UUID">
    <XS:RESTRICTION BASE="XS:DECIMAL">
        <XS:TOTALDIGITS VALUE= "39"/>
        <XS:FRACTIONDIGITS VALUE= "0"/>
        <XS:MININCLUSIVE VALUE= "000000000000000000"/>
        <XS:MAXINCLUSIVE VALUE= "999999999999999999"/>
    </XS:RESTRICTION>
</XS:SIMPLETYPE>

<XS:SIMPLETYPE NAME= "LIMITEDDATETIME">
    <XS:RESTRICTION BASE="XS:DATETIME">
        <XS:MININCLUSIVE VALUE= "2013-01-01T00:00:00.000-00:00"/>
    </XS:RESTRICTION>
</XS:SIMPLETYPE>

<XS:SIMPLETYPE NAME="RESPONSESTATUS">
    <XS:RESTRICTION BASE="XS:STRING>
        <XS:ENUMERATION VALUE="REQUEST FOUND"/>
        <XS:ENUMERATION VALUE="REQUEST NOT FOUND"/>
        <XS:ENUMERATION VALUE="REQUEST FAILED"/>
    </XS:RESTRICTION>
</XS:SIMPLETYPE>

<XS:SIMPLETYPE NAME="NUMBER">
    <XS:RESTRICTION BASE="XS:DECIMAL>
        <XS:TOTALDIGITS VALUE="4"/>
        <XS:FRACTIONDIGITS VALUE="0"/>
        <XS:MININCLUSIVE VALUE= "0000"/>
        <XS:MAXINCLUSIVE VALUE= "9999"/>
    </XS:RESTRICTION>
</XS:SIMPLETYPE>
```

*FIG. 5*

```
<XS:COMPLEXTYPE NAME="QUEUE">
    <XS:SEQUENCE>
        <XS:ELEMENT NAME="QUEUETYPE" TYPE="SQSQUEUETYPE"/>
        <XS:ELEMENT NAME="CREATIONDATE" TYPE="LIMITEDDATETIME"/>
        <XS:ELEMENT NAME="LASTUPDATEDATE" TYPE="LIMITEDDATETIME"/>
        <XS:ELEMENT NAME="MESSAGERETENTIONPERIOD" TYPE="MILLISECONDS"/>
        <XS:ELEMENT NAME="MAXMESSAGESIZE" TYPE="NUMBER"/>
        <XS:ELEMENT NAME="RECEIVEMSGWAITTIME" TYPE="MILLISECONDS"/>
        <XS:ELEMENT NAME="MSGSAVAILABLE" TYPE="NUMBER"/>
        <XS:ELEMENT NAME="MSGSDELAYED" TYPE="NUMBER"/>
    </XS:SEQUENCE>
</XS:COMPLEXTYPE>

<XS:COMPLEXTYPE NAME="DBTABLE">
    <XS:SEQUENCE>
        <XS:ELEMENT NAME="TTLATTRIBUTE" TYPE="XS:BOOLEAN"/>
        <XS:ELEMENT NAME="TABLESTATUS" TYPE="XS:BOOLEAN"/>
        <XS:ELEMENT NAME="CREATIONDATE" TYPE="LIMITEDDATETIME"/>
        <XS:ELEMENT NAME="MESSAGERETENTIONPERIOD" TYPE="MILLISECONDS"/>
        <XS:ELEMENT NAME="RCU" TYPE="NUMBER"/>
        <XS:ELEMENT NAME="WCU" TYPE="NUMBER"/>
        <XS:ELEMENT NAME="MSGSAVAILABLE" TYPE="NUMBER"/>
        <XS:ELEMENT NAME="INDEX" TYPE="INDEX" MINOCC="0" MAXOCC="10"/>
    </XS:SEQUENCE>
</XS:COMPLEXTYPE>

<XS:COMPLEXTYPE NAME="BUCKET">
    <XS:SEQUENCE>
        <XS:ELEMENT NAME="ACCESS" TYPE="ACCESSTYPE"/>
        <XS:ELEMENT NAME="CREATIONDATE" TYPE="LIMITEDDATETIME"/>
    </XS:SEQUENCE>
</XS:COMPLEXTYPE>

<XS:COMPLEXTYPE NAME="TOPIC">
    <XS:SEQUENCE>
        <XS:ELEMENT NAME="SUBSCRIPTIONCOUNT" TYPE="NUMBER"/>
    </XS:SEQUENCE>
</XS:COMPLEXTYPE>

<XS:COMPLEXTYPE NAME="ACCOUNT">
    <XS:SEQUENCE>
        <XS:ELEMENT NAME="ACCID" TYPE="INTERNALACCID"/>
        <XS:ELEMENT NAME="QUEUE" TYPE="QUEUE" MINOC="0" MAXOCC="99"/>
        <XS:ELEMENT NAME="DBTABLE" TYPE="DBTABLE" MINOCC="0" MAXOCC="99"/>
        <XS:ELEMENT NAME="BUCKET" TYPE="BUCKET" MINOCC="0" MAXOCC="99"/>
        <XS:ELEMENT NAME="TOPIC" TYPE="TOPIC" MINOCC="0" MAXOCC="99"/>
        <XS:ELEMENT NAME="STATUSTIME" TYPE="LIMITEDDATETIME">
    </XS:SEQUENCE>
</XS:COMPLEXTYPE>
```

FIG. 6

ASYNCHRONOUS SEARCHING OF PROTECTED AREAS OF A PROVIDER NETWORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Some clients may shift their computing resources from being on-premises and controlled by the user into data centers administered and managed by a data center operator or other service provider. However, different users may have different security requirements, which may limit the number of employees of the provider who are available to administer and manage computing resources for high security clients.

BRIEF DESCRIPTION OF DRAWINGS

Various embodiments in accordance with the present disclosure will be described with reference to the drawings, in which:

FIG. 5 is an example schema, according to some embodiments.

FIG. 6 is another example schema, according to some embodiments.

DETAILED DESCRIPTION

The present disclosure relates to methods, apparatus, systems, and non-transitory computer-readable storage media for searching for resources in a protected area of a provider network. According to some embodiments, a secure query service can enable users who do not have clearance to access resources in a protected area of a provider network to obtain information about those resources. A provider network may provide protected areas to some customers who require a higher security environment in which to operate. A protected area of the provider network may include a set of computing resources that are air-gapped (e.g., resources that do not have internet connectivity or otherwise cannot communicate readily with resources in other areas of the provider network and/or resources external to the provider network).

Previously, such areas could only be accessed by certain administrators, engineers, or other employees of the provider network who had sufficient clearance levels to access the protected area. Uncleared users would be required send requests to cleared users to obtain information about the resources in the protected area (e.g., to troubleshoot the resources, deploy new resources, etc.). This information may include unclassified metadata associated with the resources in the protected area, such as when resources were created, utilization levels of the resources, account details, etc. Embodiments enable unclassified metadata (e.g., metadata that has not been classified or metadata that has been explicitly cleared to be transmitted from the protected area) associated with the resources in the protected area to be obtained programmatically for uncleared users in response to search query requests from the uncleared users while ensuring that classified data and metadata remains protected in the protected area. To maintain required levels of security, the requests and responses can be filtered using schemas. Each protected area may define its own schemas, which may include a low-to-high schema, which filters requests being received by the protected area, and a high-to-low schema, which filters responses being sent from the protected area. These schemas may filter requests and responses differently. For example, a low-to-high schema may restrict some file types (e.g., binaries or other executables) from being received in the protected area, which a high-to-low schema may restrict the content of the responses that may be sent from the protected area. This ensures that only particular metadata that has been authorized to leave the protected area is allowed to be provided in a query response.

Figure 1:
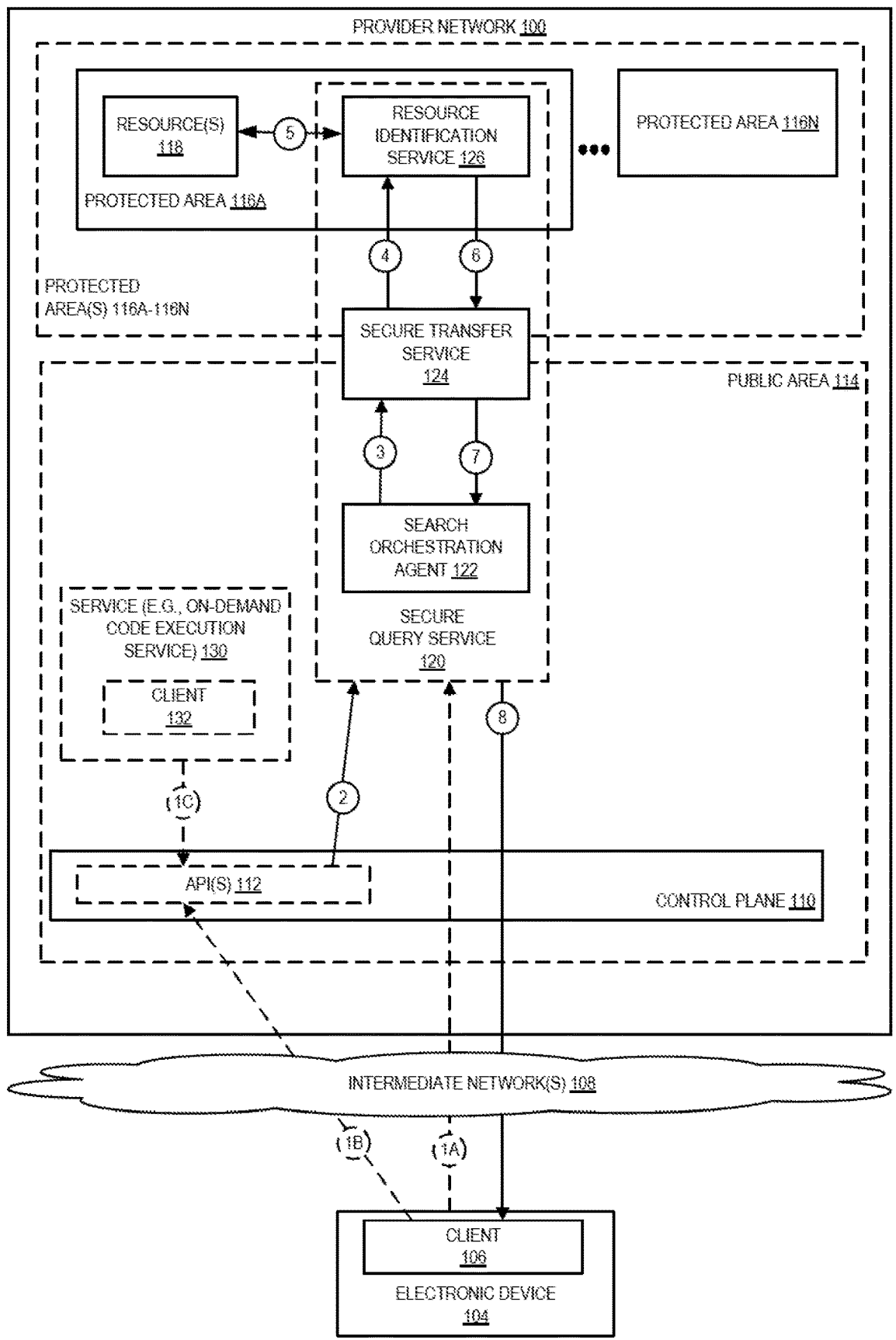
FIG. 1 is a diagram illustrating a framework for searching for resources in a protected area of a provider network, according to some embodiments.

FIG. 1 is a diagram illustrating a framework for searching for resources in an isolated area of a provider network, according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 108 (e.g., the internet) via one or more interface(s), such as through use of application programming interface (API) calls 112, via a console implemented as a website or application, etc. The API(s) 112 may be part of, or serve as a front-end to, a control plane 110 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In some embodiments, the provider network 100 can be optionally subdivided into different areas. For example, as illustrated in FIG. 1, the provider network 100 may be subdivided into a public area 114 and one or more protected areas 116A-116N. Each area may be logically isolated from the other (and from any other areas not shown within provider network 100. For example, each area may be a distinct logical data center, supported by one or more physical data centers, and each area may have its own power supply and networking infrastructure to limit the likelihood of a failure in one area from affecting another area. In various embodiments provider network 100 may include a plurality of regions, each having its own plurality of areas. Each region of provider network 100 may include resources located in the same geographic area (e.g., state, country, etc.). By dividing provider network 100 into various regions and areas, the data and customer instances stored therein can be protected against failure events and access to different areas may be separately controlled.

In some embodiments, the public area 114 may be an area within the provider network that provides open access to, and interconnectivity among, a plurality of entities (users) of the provider network. The protected areas 116A-116N may be areas within a private area of the provider network and may be air-gapped from other areas of the provider network. Access to protected areas of the provider network, and interconnectivity between a protected area and other areas of the provider network (e.g., ability to receive data into and send data from the protected area) may be restricted to certain users of the provider network. In some embodiments, the protected areas 116A-116N may comprise one or more resource(s) 118. The resources 118 may comprise, for instance, computation and storage resources utilized by applications and/or services implemented on various devices/hosts in the protected areas 116A-116N. Because the protected areas of the provider network may include sensitive or otherwise protected information (e.g., information designated by a governmental or non-governmental entity as classified data or classified metadata), access to the protected areas may be restricted to users who have been cleared to view such protected information (e.g., cleared users). Deployment, maintenance, and use of these resources may be associated with different cleared users and uncleared users, which may include internal users (e.g., users of the provider network that develop applications or services that the provider network 100 offers to external users) and external users (e.g., customers of the provider network that host their own solutions within the provider network 100). The resources 118 may be associated with a particular user or account or may be generally accessible to multiple users and/or multiple accounts.

In some embodiments, the secure query service 120 provides uncleared users of the provider network 100 who do not have access to the one or more of the protected areas 116A-116N with the ability to request and/or query for information about the resources 118. As discussed, previously such uncleared users would have to request such information from cleared users. Because there are typically many fewer cleared users than uncleared users, this can be a time consuming process for the cleared users to respond to such requests. Additionally, it introduces the possibility of human error leading to incorrect or inaccurate information about the resources being relayed to the uncleared users, leading to further delays in deploying infrastructure, troubleshooting, or otherwise maintaining the protected areas of the provider network. The secure query service 120 may include various components, modules, or functionalities such as a search orchestration agent 122, a secure transfer service 124 and a resource identification service 126. The components may be implemented in hardware, software, or a combination of both and collectively used by the secure query service 120 for executing search queries against resources hosted in one or more protected areas 116A-116N of the provider network.

In some embodiments, the secure query service 120 and its components may be distributed across different areas (e.g., the public area 114 and the protected area(s) 116A-116N) in the provider network. For instance, as shown in FIG. 1, the search orchestration agent 122 may be implemented in the public area 114 and used by the secure query service to obtain search requests (from users) for resources residing in the protected areas 116A-116N of the provider network. The resource identification service 126 may be implemented in the protected areas 116A-116N and used by the secure query service 120 to execute the search requests and provide search responses to the users. The secure transfer service 124 may include one or more components, modules, or functionalities that may be implemented in both the public area 114 and protected areas 116A-116N. In some embodiments, the secure query service 120 may utilize the secure transfer service 124 to process search requests for resources residing in the protected areas 116A-116N, cause the execution of the search requests against the resources and send search responses to the users.

In some embodiments, at numeral 1A, a search query request may be submitted to the secure query service 120 via a client application 106 of an electronic device 104. For example, a user may interact with a user interface (UI) in the client application 106 to submit the search query request. In some embodiments, the search query request may specify a request for information about a resource in a protected area (e.g., 116A) of the provider network for which the user is responsible for maintaining, troubleshooting, deploying, etc. (e.g., the user has an account associated with the resource). In some embodiments, the search query request may specify one or more search parameters. For instance, the search parameters may include an identifier (e.g., name) of the resource and an identifier of a protected area (e.g., 116A) where the resource is located. For example, a search query request for information about a database instance (e.g., a database table in the database instance) in a protected area 116A may specify an identifier associated with the database table and an identifier of the protected area 116A where the database table is located. The database table may be associated with the user's account and may include permissions indicating the ways in which the user may access and/or query information about the database table. In some embodiments, the user may first be authenticated using an authentication service in the provider network which authenticates the user making the search request prior to submitting the search request to the secure query service 120. For instance, the authentication service 128 may authenticate the user based on data provided by the user (e.g., credentials, encrypted material, etc.).

Alternatively, in some embodiments, at numeral 1B, a search query request may be submitted by the user via an Application Programing Interface (API) call to an API 112 in a control plane 110 in the provider network 100. For instance, the user may submit the API call via the client application 106 of the electronic device 104 which may potentially occur responsive to a user interacting with the client application 106. For example, the user may interact with a UI in the client application 106 to submit an API request. Alternatively, in some embodiments, the client application may directly issue the search query request (e.g., as an API request) as part of a script or program without user interaction. The search query request may be received via one or more APIs 112 in the control plane 110 which may then transmit the search query request to the secure query service 120. The control plane 110 may handle many of the tasks involved in accepting and processing requests from users, including traffic management, authorization and access control, monitoring, and API management. For example, in some embodiments the control plane 110 creates, publishes, maintains, and monitors various APIs for users to access and interact with services of the provider network 100. In some embodiments, as shown at numeral 1C, the search request may also originate from another client application 132 implemented within another service 130 in the provider network such as an on-demand code execution service, a hardware virtualization service, or another service implemented by the provider network.

Secure query service 120 can receive the search query request (e.g., directly via client application 106 as shown at numeral 1A, or via API 112 at numeral 2). The search query request may be received by the search orchestration agent 122 in the secure query service 120. As discussed further below, the search orchestration agent 122 can store a record of the search and pass the search, at numeral 3, to secure transfer service 124. As shown in FIG. 1, secure transfer service 124 may be implemented across the public area and the protected area of the provider network. For example, the secure transfer service 124 may include a first storage location hosted in the public area in which the search query request may be stored. The secure transfer service can verify the search query request (e.g., apply a first schema provided by the protected area to the search query request) before passing the search query request to a second storage location hosted in the destination protected area 116A. Once the search query request has been added to the second storage location, at numeral 4, an event can be generated and sent to resource identification service 126. Resource identification service 126 may then perform the query on resources 118, as shown at numeral 5. The resource identification service may then generate a response based on the query results. At numeral 6, the resource identification service 126 can add the response to the second storage location of secure transfer service 124. The response can be verified using a second schema provided by the protected area 116A to ensure the response includes only data that is allowed to be sent from the protected area to a public area. Once the response is verified, it can be added to the first storage location of the secure transfer service 124. This may trigger an event, at numeral 7, to search orchestration agent 122 indicating that a response has been added to the first storage location. Search orchestration agent 122 can obtain the response from the first storage location and provide the response to the client application 106 (e.g., via a notification, email, or other communication) at numeral 8.

Figure 2:
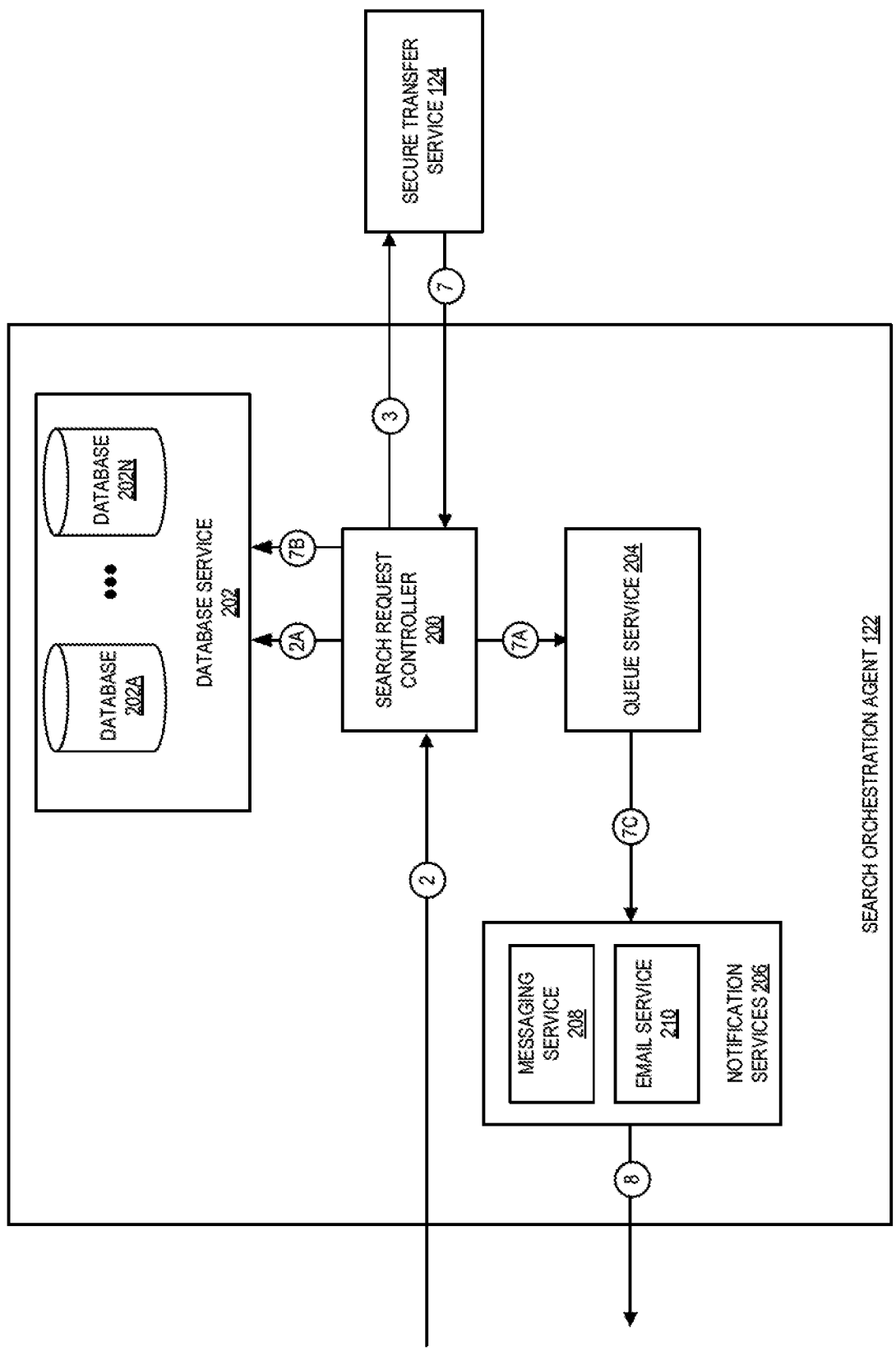
FIG. 2 is a diagram illustrating exemplary operations performed by one or more components of the search orchestration agent upon receiving a search query request, according to some embodiments.

FIG. 2 is a diagram illustrating exemplary operations performed by one or more components of the search orchestration agent 122 upon receiving a search query request, according to some embodiments. Referring to FIG. 2, in some embodiments, at numeral 2, a search request controller 200 in the search orchestration agent 122 may receive the search query request. Upon receiving the search query request, the search request controller 200 may perform access control checks to verify the identity of the user and the user's associated permissions with an account to request information about resources in the protected area (e.g., 116A). At numeral 2A, the controller 200 may store search details pertaining to the search query request in a database 202A implemented by a database service 202 in the provider network. The search details may include an identifier associated with the requestor and/or the account associated with the requestor, the resource to be queried, any search terms included in the search query request, etc. In some embodiments, the database service 202 may be implemented as a nonrelational database service comprising one or more nonrelational databases. As described herein, a nonrelational database provides for the storage and retrieval of data using data structures other than tabular relations traditionally used in relational database systems. In some embodiments, a nonrelational database (e.g., 202A-202N) may include of one or more tables, items, and attributes. A table is a collection of items and each item is a collection of attributes. For instance, a nonrelational database 202A that stores search details pertaining to search query requests may include a search request table where each item in the table represents a search record pertaining to a search query request for a resource. The search request table may further include various attributes for each search record such as, for example, a resource identifier, a resource name, resource type, an identifier of a protected area, an identifier associated with the requestor, and the like.

At numeral 3, the search request controller 200 may submit the search query request to the secure transfer service 124 in the secure query service 120. As discussed above with respect to numerals 4-6 of FIG. 1, the search query request can be processed by the secure transfer service, which verifies the search query request using a first schema and the search query response, output at numeral 7, using a second schema. This ensures that data sent to and from a protected area of the provider network complies with the security requirements of the protected area. At numeral 7, the search request controller 200 can obtain the search query response from the secure transfer service 124. As shown in FIG. 2, search orchestration agent 122 may include a queue service 204, to which the search query response can be added by the search request controller at numeral 7A. In some embodiments, at numeral 7B, the search query response (or a representation of all or a portion thereof, may be added to a database instance 202A-202N of database service 202. This may be stored for logging purposes (e.g., as part of an audit trail). At numeral 7C, the queue service 204 can process search query responses in its queue to notify the requestor of the results of the query response.

As shown in FIG. 2, the search query response may be communicated to the requestor through one or more notification services 206, such as messaging service 208 or email service 210. Messaging service 208 may cause a notification to be displayed on the requestor's electronic device, such as through a notification in client application 106, as a Simple Messaging Service (SMS) message, or other notification. Email service 210 may generate an email that includes the search query response as an attachment and/or in the body of the email. In some embodiments, the initial search query request may include an indication as to which notification service or services are to be used to send the search query response as well as one or more identifiers (e.g., email addresses, phone numbers, etc.) associated with the indicated notification service(s). At numeral 8, the search query response can be returned using the indicated notification service(s) 206.

Figure 3:
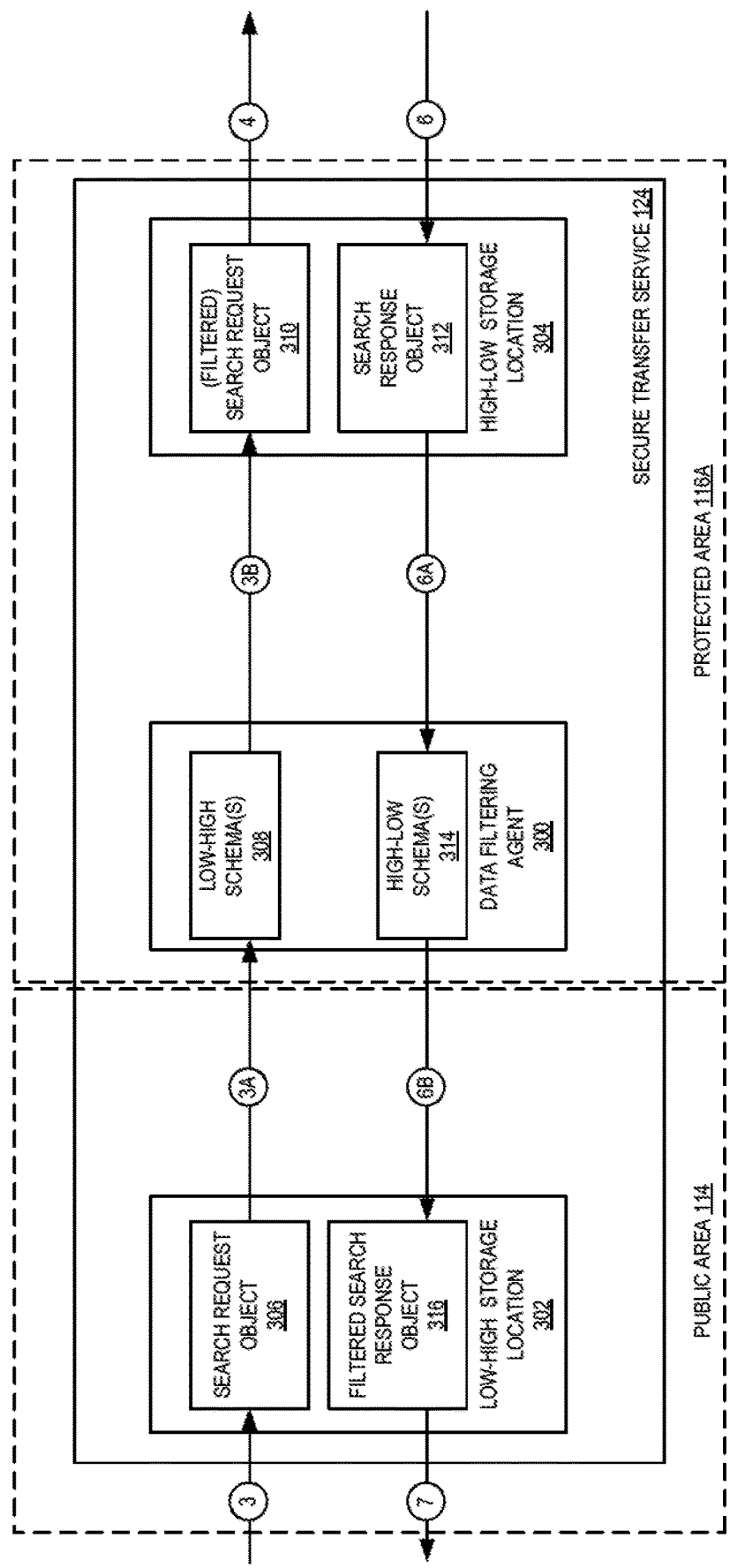
FIG. 3 is a diagram illustrating exemplary operations performed by one or more components of the secure transfer service for processing a search query request and a search query response, according to some embodiments.

FIG. 3 is a diagram illustrating exemplary operations performed by one or more components of the secure transfer service 124 for processing a search query request accessible in a protected area (e.g., 116A) of the provider network and obtaining a search query response as a result of executing the search query request according to some embodiments. Referring to FIG. 3, in some embodiments, the secure transfer service 124 comprises a data filtering agent 300, a low-high storage location 302 and a high-low storage location 304. In some embodiments, the low-high storage location 302 and the high-low storage location 304 may be implemented as part of a storage service provided by the provider network. In some embodiments, and as will be described in detail below, the storage service may provide object-based storage that may be used by the secure transfer service 124 to process a search query request for a resource and obtain a search query response as a result of execution of the search request.

In some embodiments, the low-high storage location 302 (e.g., a first storage location) may be implemented in the public area 114 of the provider network and the high-low storage location (e.g., a second storage location) may be implemented in the protected area 116A of the provider network. In some embodiments, as discussed above with respect to FIGS. 1-2, at numeral 3, the secure transfer service 124 receives the search query request from the search orchestration agent 122 and stores the search query request in the low-high storage location 302. In some embodiments, a representation of the search query request may be stored as, e.g., an object, record, or file in the low-high storage location 302 and referenced by a URL (Uniform Resource Locator).

At numeral 3A, the data filtering agent 300 may access the low-high storage location 302 (e.g., programmatically or via an API call) and retrieve the search request object 306 from the low-high storage location 302. For example, the data filtering agent 300 may be configured to use the URL referencing the search request object 306 to retrieve the object from the low-high storage location 302. In some embodiments, the data filtering agent 300 may determine that there is a search request object 306 stored in the low-high storage location 302 by periodically polling the low-high storage location 302. In other examples, the data filtering agent 300 may subscribe to a monitoring service in the provider network that may inform the low-high storage location 302 of the existence of a search request object 306. As shown in FIG. 3, the data filtering agent 300 can be hosted in protected area 116A and managed by the protected area. For example, the schemas implemented by the data filtering agent 300 may be controlled by the protected area, to ensure that the security standards required by the protected area are implemented in the schemas.

In some embodiments, the data filtering agent 300 may perform checks on the search request object 306 before the search request object is sent to the high-low storage location 304 in protected area 116A. For instance, in some embodiments, the data filtering agent 300 may identify a low-high schema 308 to be applied to the search request object to verify the search request object (e.g., to determine whether the search request object includes any prohibited data, as defined in the low-high schema). For example, the low-high schema 308 may analyze the search request object 306 to filter out executable file types, such as binaries, from the search request object and allow free form strings, integers, or text fields in metadata associated with the search request object 306. If any prohibited data is identified in the search request object, the search may fail and a response indicating such can be returned. Alternatively, in some embodiments, the prohibited data may be removed from the search request object, and the resulting filtered search request object can be used to perform the search.

Upon verification of the search request object, at numeral 3B, the data filtering agent 300 may generate a filtered search request object 310 and transmit the filtered search request object 310 to the high-low storage location 304 associated with the secure transfer service 124. In some embodiments, the high-low storage location 304 may be located in the protected area 116A of the provider network 100. In some embodiments, the storage of the filtered search request object 310 may trigger an event which may in turn cause the high-low storage location 304 to publish a message to the search gatherer service 126 of the existence of the filtered search request object 310 in the high-low storage location 304.

As discussed above, secure transfer service 124 may also manage the return of a search query response to the requestor. In some embodiments, at numeral 6, a representation of the search query response is stored as a search response object 312 in the high-low storage location 304. For example, as discussed above with respect to FIG. 1, the resource identification service 126 can perform the search request query, generate a search request response, and return a representation of the search request response (e.g., an object, record, file, etc.). At numeral 6A, the data filtering agent is notified that a search result is in the second storage location and accesses the second storage location (e.g., programmatically or via an API call). The data filtering agent 300 then identifies a second schema to be applied to one or more attributes, and/or types of attributes of the search response object. In some embodiments, the second schema identifies a type of each of one or more attributes of the search response object 312 and comprises one or more validation rules indicating at least one expected characteristic of values of the attributes of the search response object. For example, the second schema may define particular types of metadata (e.g., specific attributes about one or more of the types of resources which may be included in the protected area) that are allowed to be included in the search response object. Additionally, or alternatively, the second schema may define prohibited types of metadata that are not allowed to be included in the search response object. Further, the second schema may define validation rules which may specify one or more threshold values that the metadata values must not be larger than, smaller than, etc. The rule may specify that values of the attribute must be within a set of defined values. The rule may specify that values of the attribute must be larger than, equal to, and/or smaller than some other value that can be derived (e.g., dynamically, or periodically) based on other data. At numeral 6B, the data filtering agent publishes an event to the first storage location to store the search result which includes metadata about the resource. If any prohibited information (e.g., based on the type of information or the value of the information included in the response object) is identified in the search response object, the search may fail and a response indicating such can be returned. Alternatively, in some embodiments, the prohibited information may be removed from the search response object, and the resulting filtered search response object can be returned. At numeral 7, the search response is returned to the search orchestration agent 122, and the search query response is returned to the requestor as discussed above.

Figure 4:
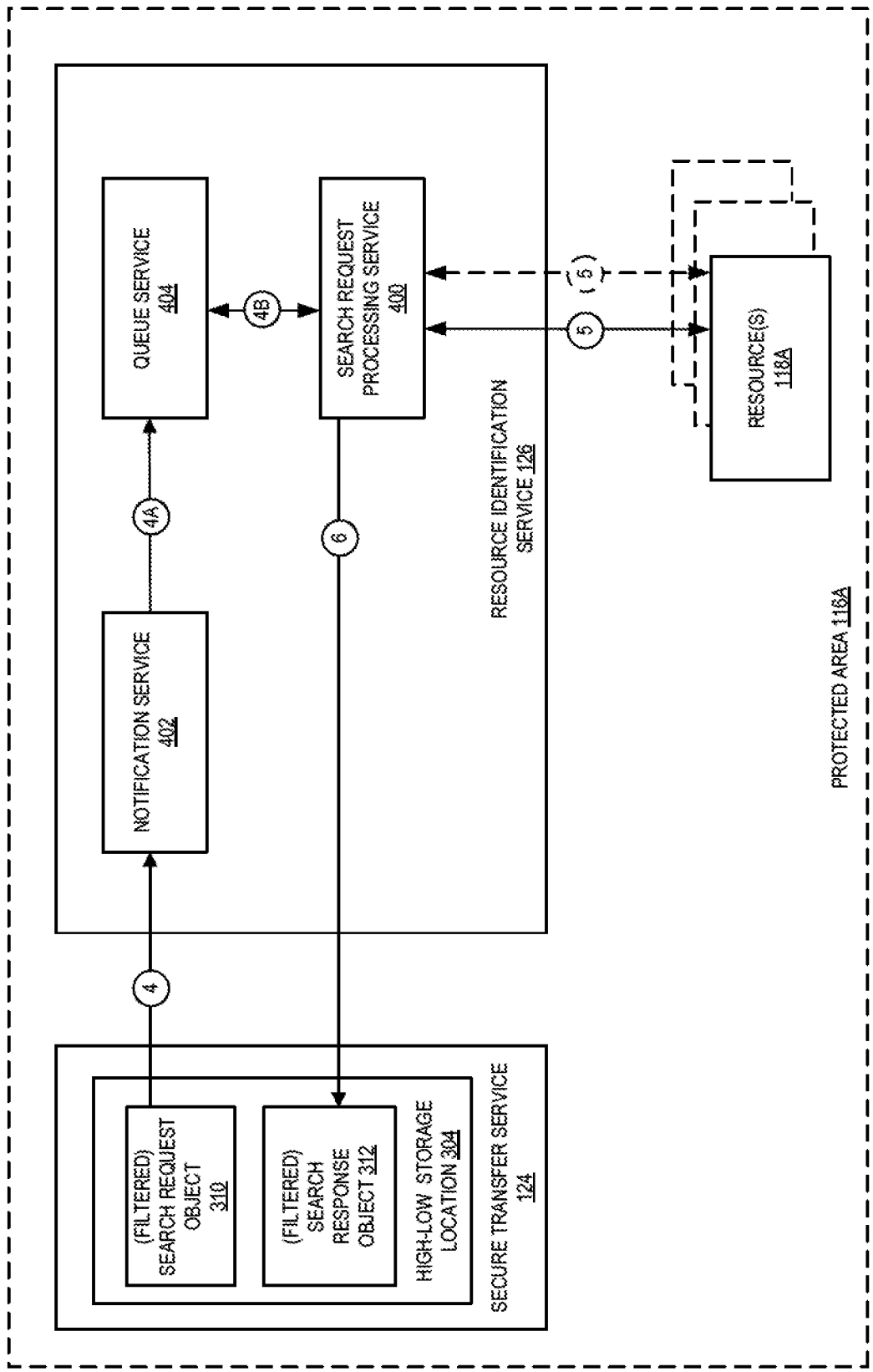
FIG. 4 is a diagram illustrating exemplary operations performed by one or more components of resource identification service to perform a search query, according to some embodiments.

FIG. 4 is a diagram illustrating exemplary operations performed by one or more components of resource identification service 126 when it receives a filtered search request object 310 according to some embodiments. Referring to FIG. 4, in some embodiments, the resource identification service 126 may include components, modules, or functionalities such as a search request processing service 400, a notification service 402, and a queue service 404. The components may be implemented in hardware, software, or a combination of both and collectively used by the resource identification service 126 for executing search query requests against resources hosted in a protected area (e.g., 116A) of the provider network. The resource identification service can determine when a search request has been received, process the search request, and generate search responses.

In some embodiments, as discussed above, at numeral 4, the notification service 402 may receive a message (e.g., via an event or other notification) from the secure transfer service 124. At numeral 4A, the notification service 402 sends the message to a message queue implemented by a queue service 404. At numeral 4B, the search request processing service 400 may poll the message queue implemented by the queue service 404 for messages (e.g., the message received from the notification service 402) and parse the message to obtain details of the message. At numeral 5, search request processing service 400 may execute the search request against the resources 118A, obtain a search result which includes metadata associated with the resources 118, based on the search request. The search request processing service 400 can format metadata into a search query response and, at numeral 6, submit the search query response to second storage location.

FIG. 5 is an example schema, according to some embodiments. As shown in FIG. 5, an example schema 500 may define restrictions for various attributes which may be included in a query response. For example, any attribute including a date stamp may be restricted to a particular range of dates. When the schema is applied to a query response, any attribute having a date stamp value outside this range may be removed from the query response before it is returned to the requestor, or the query response may fail, and a request failed response may be returned. Other attributes that may be restricted may include universally unique identifiers (UUIDs), numbers, response status, etc.

FIG. 6 is another example schema, according to some embodiments. As shown in FIG. 6, an example schema 600 may also specify particular metadata that may be included for different resource types. For example, a queue may include a queue type, creation date, last update date, message retention period, maximum message size, receive message wait time, number of messages available, and number of messages delayed. When the schema is applied to a query response, any metadata included for a queue other than those specified in the schema may be removed from the query response or the query response may fail, and a request failed response may be returned. The schema may also define the metadata that may be returned for other resources that may be deployed to the protected area, such as database tables or other storage services, topics, accounts, etc.

Figure 7:
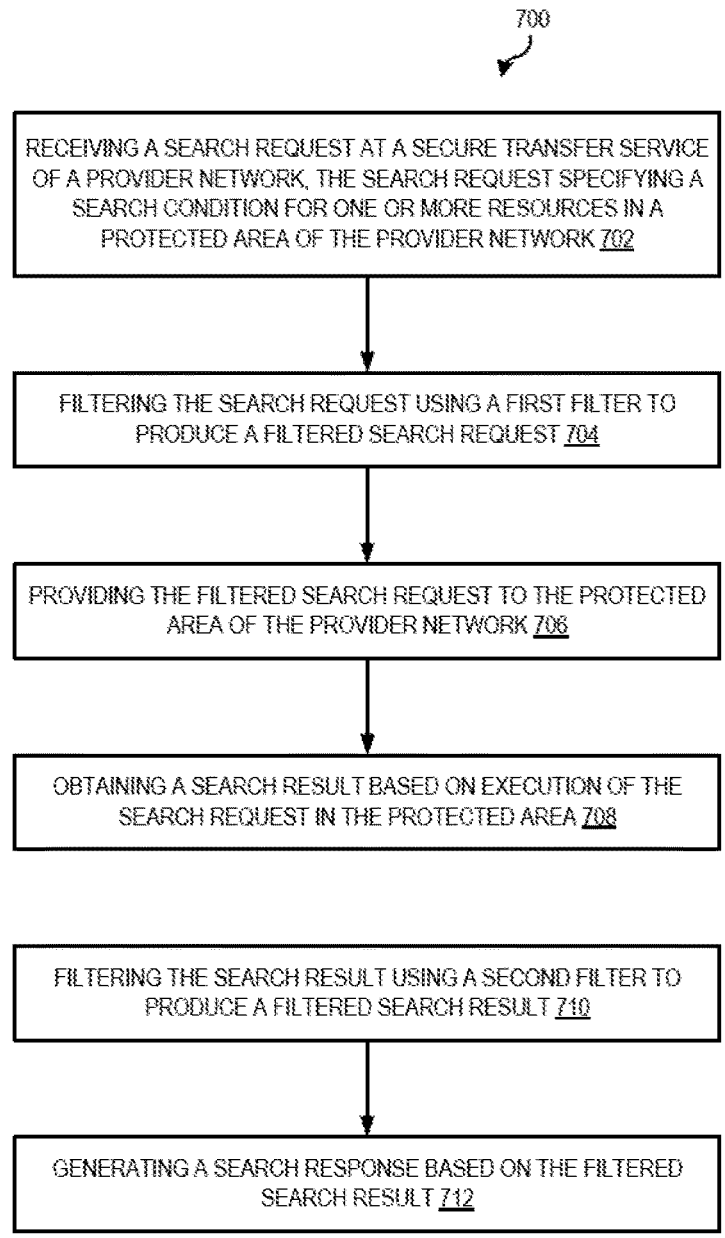
FIG. 7 is a flow diagram illustrating operations of a method for searching for resources in a protected area of a provider network according to some embodiments.

FIG. 7 is a flow diagram illustrating operations 700 of a method for asynchronous searching of protected areas of a provider network according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by the secure query service 120 of the other figures.

The operations 700 include, at block 702, receiving a search request at a secure query service of a provider network, the search request specifying a search condition for one or more resources in a protected area of the provider network.

The operations 700 further include, at block 704, filtering the search request using a first filter to produce a filtered search request. In some embodiments, filtering the search request includes sending the search request to a first storage location associated with the secure query service, wherein the first storage location is in a public area of the provider network, when the search request is added to the first storage location, sending a first notification indicating that the search request has been added to the first storage location, and applying the first schema to the search request.

In some embodiments, applying the first schema to the search request further comprises searching the search request for any prohibited file types defined by the first schema, wherein the prohibited file types include executable file types, upon identifying at least one prohibited file type in the search request, preventing the search request from being added to a second storage location located in the protected area of the provider network, and returning a response indicating the search request has failed.

The operations 700 further include, at block 706, providing the filtered search request to the protected area of the provider network. The operations 700 further include, at block 708, obtaining a search result based on execution of the search request in the protected area.

The operations 700 further include, at block 710, filtering the search result using a second filter to produce a filtered search result. In some embodiments, the first filter is a first schema that restricts data that can be sent from a public area of the provider network to the protected area of the provider network, and wherein the second filter is a second schema that restricts data that can be sent from the protected area of the provider network to the public area of the provider network. In some embodiments, filtering the search response includes sending the search result to a second storage location associated with the secure query service, wherein the second storage location is in the protected area of the provider network, when the search result is added to the first storage location, sending a second notification indicating that the search result has been added to the second storage location, and applying the second schema to the search results.

In some embodiments, applying the second schema to the search request further comprises searching the search result for prohibited data defined by the second schema, wherein the prohibited data includes at least one of classified data or classified metadata, upon identifying the prohibited data in the search response, preventing the search result from being added to the first storage location, and returning a response to the first storage location indicating the search request has failed.

The operations 700 further include, at block 712, generating a search response based on the filtered search result. In some embodiments, the search response includes unclassified metadata associated with one or more resources identified based on the search request. In some embodiments, the unclassified metadata includes at least one of resource creation date, resource utilization, or resource quantity.

In some embodiments, the operations may further include sending the search response to a notification service, the notification service to provide the search response to a client that sent the search request. In some embodiments, the notification service includes at least one of a messaging service or an email service.

In some embodiments, the operations may further include storing a representation of the search request to an instance of a database service associated with the secure query service, and storing a representation of the search response to the instance of a database service associated with the secure query service.

In some embodiments, the operations may include receiving, from a client device, a search request at a secure query service of a provider network, the search request specifying a name of at least one resource in a protected area of the provider network and a query associated with the at least one resource, adding the search request to a first storage location in a public area of the provider network, applying a first schema to the search request to produce a filtered search request, the schema to validate one or more attributes of the search request, sending the filtered search request to a second storage location in the protected area of the provider network, executing the search request on the at least one resource in the protected area of the provider network using the name of the at least one resource, obtaining metadata associated with the at least one resource in response to the search request, generating a search result including the metadata associated with the at least one resource, applying a second schema to the search result to produce a filtered search result, the second schema to validate one or more attributes of the search result, generating a search response based on the filtered search result, and returning the search response to the client device via a notification service. In some embodiments, the second schema restricts a value of the one or more attributes included in the search response. In some embodiments, the filtered search request is formatted as a text file.

Figure 8:
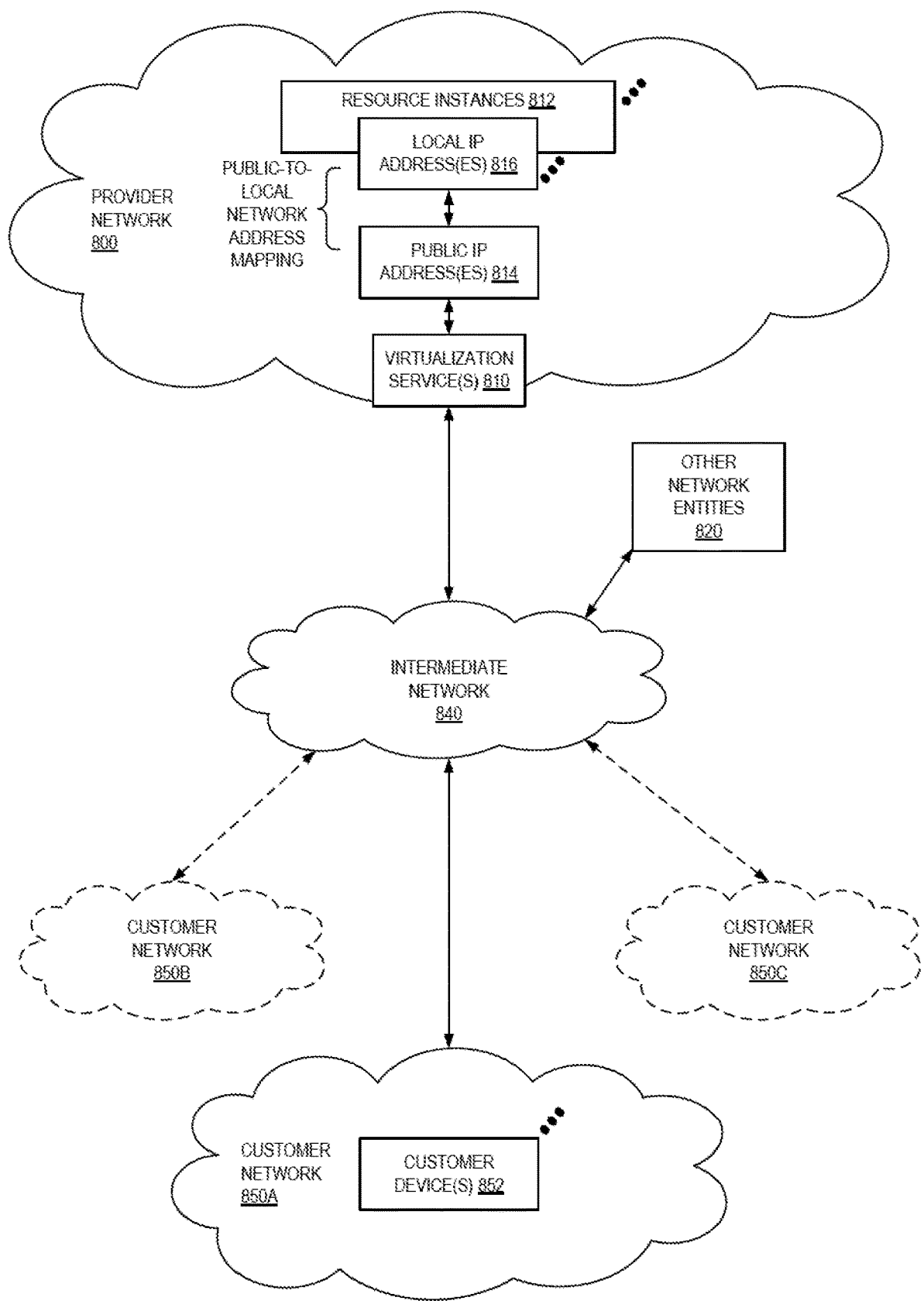
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
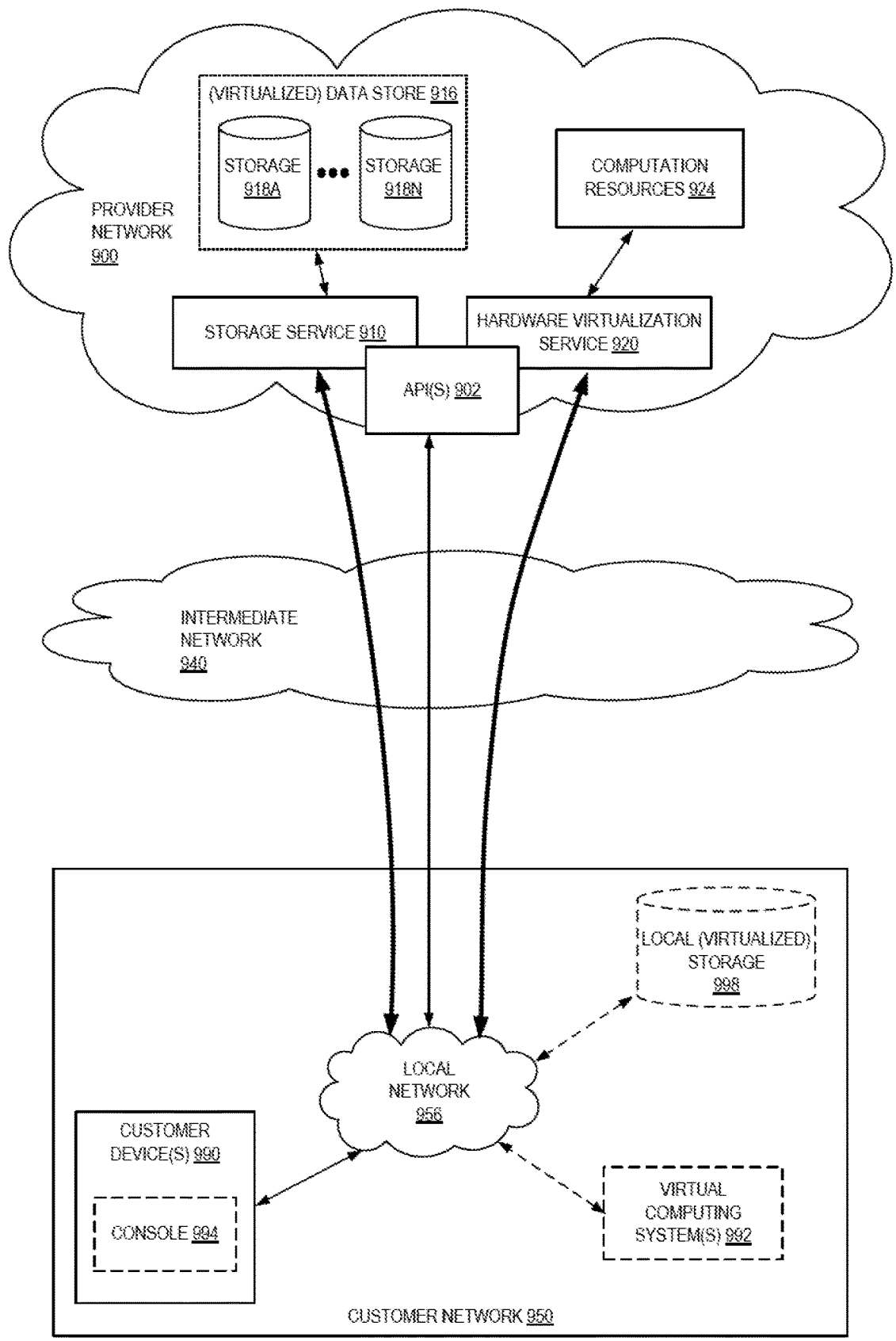
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
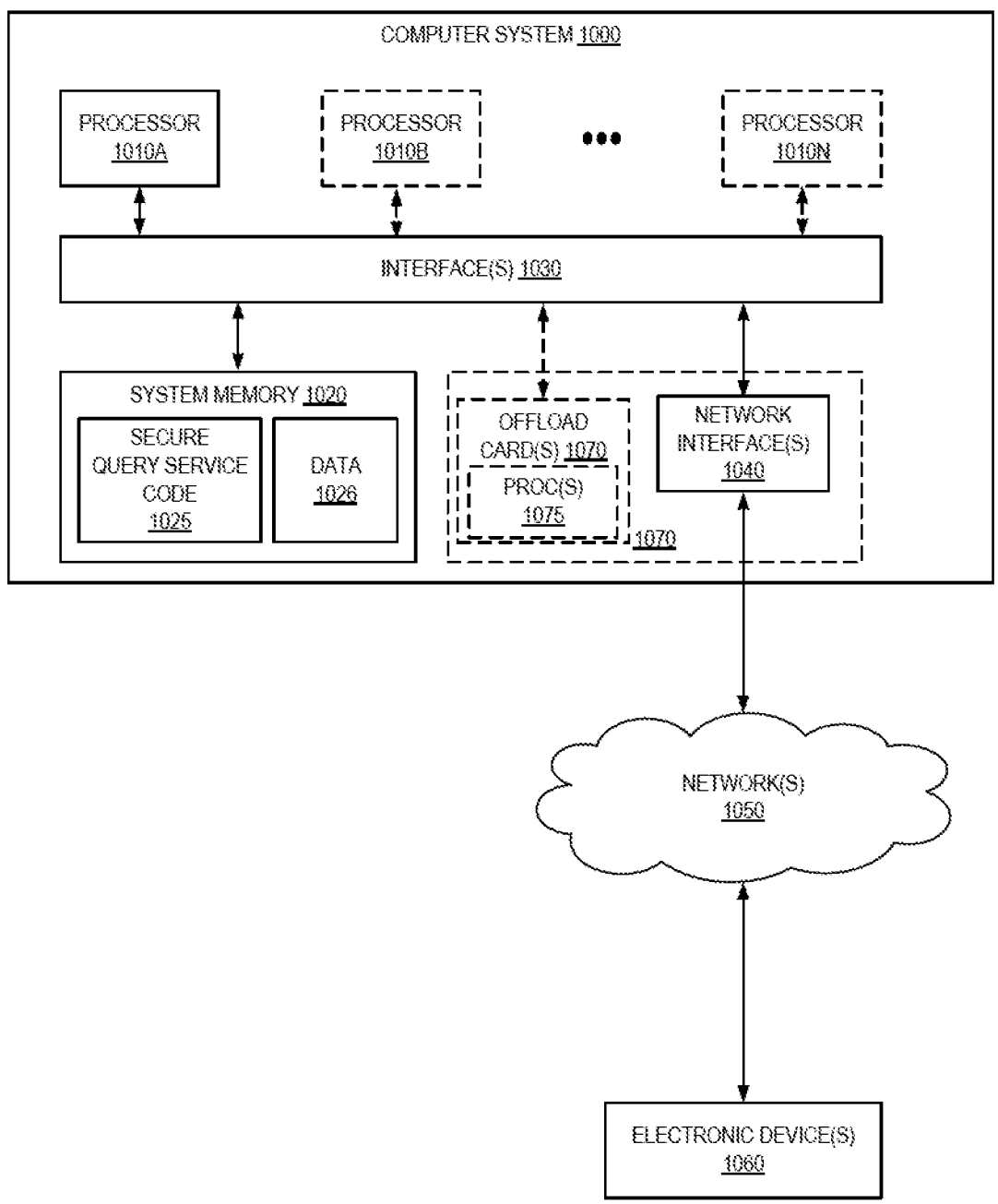
FIG. 10 is a block diagram illustrating an example computer system that may be used in some embodiments.

In some embodiments, a system that implements a portion or all of the techniques for asynchronous searching of protected areas of a provider network as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as secure query service code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in some embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, from a client device, a search request at a secure query service of a provider network, the search request specifying a name of at least one resource in a protected area of the provider network and a query associated with the at least one resource, the provider network comprising a public area and the protected area, the secure query service comprising a first storage location and a data filtering agent, the first storage location located in the public area, and the data filtering agent located in the protected area and configured to access the first storage location from the protected area;
   adding the search request to a first storage location in the public area of the provider network;
   retrieving, by the data filtering agent, the search request from the first storage location;
   applying, by the data filtering agent, a first schema to the search request to produce a filtered search request, the schema to validate one or more attributes of the search request;
   executing the search request on the at least one resource in the protected area of the provider network using the name of the at least one resource;
   obtaining metadata associated with the at least one resource in response to the search request;
   generating a search result including the metadata associated with the at least one resource;
   applying, by the data filtering agent, a second schema to the search result to produce a filtered search result, the second schema to validate one or more attributes of the search result; and
   publishing, by the data filtering agent, the filtered search result to the first storage location.

2. The computer-implemented method of claim 1, wherein the second schema restricts a value of the one or more attributes included in the search response.

3. The computer-implemented method of claim 1, wherein the filtered search request is formatted as a text file.

4. A computer-implemented method comprising:
   receiving a search request at a secure query service of a provider network, the search request specifying a search condition for one or more resources in a protected area of the provider network, the provider network comprising a public area and the protected area, the secure query service comprising a first storage location and a data filtering agent, the first storage location located in the public area, and the data filtering agent located in the protected area and configured to access the first storage location from the protected area;
   storing the search request in the first storage location;
   retrieving, by the data filtering agent, the search request from the first storage location;
   filtering, by the data filtering agent, the search request using a first filter to produce a filtered search request;
   obtaining a search result based on execution of the filtered search request in the protected area;
   filtering, by the data filtering agent, the search result using a second filter to produce a filtered search result; and
   publishing, by the data filtering agent, the filtered search result to the first storage location.

5. The computer-implemented method of claim 4, wherein the first filter comprises a first schema that restricts data that can be sent from the public area of the provider network to the protected area of the provider network, and wherein the second filter comprises a second schema that restricts data that can be sent from the protected area of the provider network to the public area of the provider network.

6. The computer-implemented method of claim 5, wherein filtering, by the data filtering agent, the search request using the first filter to produce the filtered search request, further comprises:
   applying, by the data filtering agent, the first schema to the search request.

7. The computer-implemented method of claim 6, wherein applying, by the data filtering agent, the first schema to the search request further comprises:

searching, by the data filtering agent, the search request for any prohibited file types defined by the first schema, wherein the prohibited file types include an executable file type;

upon identifying a prohibited file type in the search request, omitting, by the data filtering agent, the prohibited file type from the filtered search request.

8. The computer-implemented method of claim 6, wherein filtering, by the data filtering agent, the search result using the second filter to produce the filtered search result, further comprises:

applying, by the data filtering agent, the second schema to the search result.

9. The computer-implemented method of claim 6, wherein applying by the data filtering agent, the second schema to the search request further comprises:

searching, by the data filtering agent, the search result for prohibited data defined by the second schema, wherein the prohibited data includes at least one of classified data or classified metadata; and upon identifying the prohibited data in the search result, omitting, by the data filtering agent, the prohibited data from the filtered search result.

10. The computer-implemented method of claim 4, wherein the filtered search result includes unclassified metadata associated with one or more resources identified based on the search request.

11. The computer-implemented method of claim 10, wherein the unclassified metadata includes at least one of resource creation date, resource utilization, or resource quantity.

12. The computer-implemented method of claim 4, further comprising:

sending the filtered search result to a notification service, the notification service to provide the filtered search result to a client that sent the search request.

13. The computer-implemented method of claim 12, wherein the notification service includes at least one of a messaging service or an email service.

14. The computer-implemented method of claim 4, further comprising:

storing a representation of the search request to an instance of a database service associated with the secure query service; and storing a representation of the filtered search result to the instance of a database service associated with the secure query service.

15. A system comprising:

one or more electronic devices to implement a secure query service in a provider network, the provider network comprising a public area and a protected area, the secure query service comprising a first storage location and a data filtering agent, the first storage location located in the public area, the data filtering agent located in the protected area and configured to access the first storage location from the protected area, the secure query service including instructions that upon execution cause the secure query service to:

receive a search request specifying a search condition for one or more resources in a protected area of the provider network;

store the search request in the first storage location, retrieve, by the data filtering agent, the search request from the first storage location, filter, by the data filtering agent, the search request using a first filter to produce a filtered search request;

obtain a search result based on execution of the search request in the protected area;

filter, by the data filtering agent, the search result using a second filter to produce a filtered search result; and publish, by the data filtering agent, the filtered search result to the first storage location.

16. The system of claim 15, wherein the first filter comprises a first schema that restricts data that can be sent from the public area of the provider network to the protected area of the provider network, and wherein the second filter comprises a second schema that restricts data that can be sent from the protected area of the provider network to the public area of the provider network.

17. The system of claim 16, wherein to filter the search request using the first filter to produce the filtered search request, the instructions, when executed further cause the secure query service to:

apply the first schema to the search request.

18. The system of claim 17, wherein to filter the search result using the second filter to produce the filtered search result, the instructions, when executed further cause the secure query service to:

apply the second schema to the search result.

19. The system of claim 15, wherein the filtered search result comprises unclassified metadata includes at least one of resource creation date, resource utilization, or resource quantity.

20. The system of claim 19, wherein the unclassified metadata includes at least one of resource creation date, resource utilization, or resource quantity.

\* \* \* \* \*